US012746850B2

(12) United States Patent
Kharpuri et al.

(10) Patent No.: US 12,746,850 B2
(45) Date of Patent: Sep. 29, 2026

(54) HIGH VOLTAGE BATTERY SYSTEM FOR VEHICLE TO VEHICLE CHARGING

(71) Applicant: FCA US LLC, Auburn Hills, MI (US)

(72) Inventors: Rudolf B Kharpuri, Auburn Hills, MI (US); Venkatasubramanian Sankara Raman, Auburn Hills, MI (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 18/982,012

(22) Filed: Dec. 16, 2024

(65) Prior Publication Data

US 2026/0167057 A1 Jun. 18, 2026

(51) Int. Cl.

| | |
|---|---|
| ***B60L 53/62*** | (2019.01) |
| ***B60L 53/53*** | (2019.01) |
| ***B60L 53/57*** | (2019.01) |
| ***B60L 58/12*** | (2019.01) |
| ***B60L 58/21*** | (2019.01) |
| ***H02J 1/14*** | (2006.01) |
| ***H02J 7/00*** | (2006.01) |
| ***H02J 7/34*** | (2006.01) |
| ***H02J 7/82*** | (2026.01) |
| ***H02J 7/90*** | (2026.01) |
| *H02J 105/37* | (2026.01) |

(52) U.S. Cl.

CPC ............... *B60L 58/21* (2019.02); *B60L 53/53* (2019.02); *B60L 53/57* (2019.02); *B60L 53/62* (2019.02); *B60L 58/12* (2019.02); *H02J 1/14* (2013.01); *H02J 7/342* (2020.01); *H02J 7/82* (2026.01); *H02J 7/855* (2026.01); *H02J 7/933* (2026.01); *B60L 2250/00* (2013.01); *H02J 2105/37* (2026.01)

(58) Field of Classification Search

CPC ........ B60L 53/21; B60L 58/22; H02J 7/0048; H02J 7/0049; H02J 7/005; H02J 7/0063

See application file for complete search history.

(56) References Cited

U.S. PATENT DOCUMENTS

| | | | | |
|---|---|---|---|---|
| 12,296,809 B2 * | 5/2025 | Treharne | ................. | B60T 8/323 |
| 2008/0054439 A1 * | 3/2008 | Malhan | ............... | H01L 23/5385 257/E23.071 |
| 2024/0157832 A1 * | 5/2024 | Hao | ......................... | B60L 58/22 |
| 2025/0026208 A1 * | 1/2025 | Prasad | .................... | H02J 7/342 |

* cited by examiner

*Primary Examiner* — Ryan Johnson
*Assistant Examiner* — Esayas G Yeshaw
(74) *Attorney, Agent, or Firm* — Jeremy J. Klobucar

(57) ABSTRACT

An electrified vehicle includes an electrified powertrain, a high voltage (HV) battery system including a first HV battery pack and a second HV battery pack, and a HV electrical system including one or more switches and/or contactors configured to selectively connect the HV battery system to a HV bus to power HV loads within the electrified vehicle or power HV loads outside the electrified vehicle. A control system includes a controller programmed to operate in a vehicle-to-vehicle (V2V) charging mode, including, electrically disconnecting the first HV battery pack from the HV bus to function as a reserve battery, electrically connecting the second HV battery pack to the HV bus to function as a donor battery, and discharging the second HV battery pack to charge an additional electrified vehicle or power outside HV loads, while maintaining a charge of the first HV battery pack to thereby reserve power for future use.

20 Claims, 5 Drawing Sheets

HIGH VOLTAGE BATTERY SYSTEM FOR VEHICLE TO VEHICLE CHARGING

FIELD

The present application relates generally to electrified vehicles and, more particularly, to systems and methods to control high voltage battery operations.

BACKGROUND

Electrified vehicles typically include an electrified powertrain with one or more electric traction motors powered by a high voltage battery system. The high voltage battery system may also be utilized to power other high voltage loads within the vehicle, or even power high voltage loads outside the vehicle, such as other electrified vehicles. However, powering external loads may inadvertently drain the high voltage battery system until the electrified vehicle is no longer drivable. Thus, while conventional systems do work well for their intended purpose, there remains a need for improvement in the relevant art.

SUMMARY

In accordance with one example aspect of the invention, an electrified vehicle is provided. In one example implementation, the electrified vehicle includes an electrified powertrain configured to generate drive torque, a high voltage (HV) battery system for powering the electrified powertrain, the HV battery system including a first HV battery pack and a second HV battery pack, and a HV electrical system including one or more switches and/or contactors configured to selectively connect the HV battery system to a HV bus to (i) power HV loads within the electrified vehicle or (ii) power HV loads outside the electrified vehicle. A control system includes a controller programmed to operate in a vehicle-to-vehicle (V2V) charging mode, comprising: electrically disconnect, by the one or more switches and/or contactors, the first HV battery pack from the HV bus to function as a reserve battery; electrically connect, by the one or more switches and/or contactors, the second HV battery pack to the HV bus to function as a donor battery; and discharge the second HV battery pack to charge an additional electrified vehicle or power outside HV loads, while maintaining a charge of the first HV battery pack to thereby reserve power for future driving of the electrified vehicle.

In addition to the foregoing, the described vehicle may include one or more of the following features: wherein the first and second battery packs are each 400 V battery packs; wherein operating in the V2V charging mode further includes disabling, by the controller, all HV loads on the HV electrical system and confirming a battery current is less than a predetermined threshold prior to electrically disconnecting the first HV battery pack; and wherein operating in the V2V charging mode further includes providing, by the controller and a human machine interface (HMI), a user notification that the V2V charging mode is in progress and to allow for configuration of the HV battery system for external discharge.

In addition to the foregoing, the described vehicle may include one or more of the following features: wherein operating in the V2V charging mode further includes stopping, by the controller, the discharge of the second HV battery pack when a state of charge (SOC) of the second HV battery pack reaches a predetermined minimum threshold;

wherein operating in the V2V charging mode further includes providing, by the controller and a human machine interface (HMI), an option for a user to select the predetermined minimum threshold SOC; and wherein the controller is further programmed to transition the electrified vehicle from the V2V charging mode to a drive mode, including, electrically disconnect, by the one or more switches and/or contactors, the discharged second HV battery pack, and electrically connect, by the one or more switches and/or contactors, the reserve first HV battery pack to the HV bus to provide power to the electrified powertrain to drive the electrified vehicle.

In addition to the foregoing, the described vehicle may include one or more of the following features: wherein the controller is further programmed to transition the electrified vehicle from the drive mode to a charge mode, including, determine if a difference in a state of charge (SOC) of the first HV battery pack and a SOC of the second HV battery pack is within a predetermined threshold; wherein if the difference of the SOC of the first HV battery pack and the SOC of the second HV battery pack is less than the predetermined threshold, the controller is further programmed to disable all HV loads, electrically disconnect the first HV battery pack from the HV bus, electrically connect the second HV battery pack in parallel with the first HV battery pack, electrically connect both the first and second HV battery packs to the HV bus, and charge both the first and second HV battery packs simultaneously.

In addition to the foregoing, the described vehicle may include one or more of the following features: wherein if the difference of the SOC of the first HV battery pack and the SOC of the second HV battery pack is greater than the predetermined threshold, the controller is further programmed to disable all HV loads, electrically disconnect the first HV battery pack from the HV bus, electrically connect the second HV battery pack to the HV bus, charge the second HV battery pack until the SOC of the second HV battery pack is substantially similar to the SOC of the first HV battery pack, suspend charging and disable all HV loads, electrically connect the first HV battery pack to the HV bus, and resume charging and charge both the first and second HV battery packs simultaneously.

In accordance with another example aspect of the invention, a method of controlling a high voltage (HV) battery system for an electrified vehicle is provided. The HV battery system includes a first HV battery pack and a second HV battery pack configured to selectively connect to a HV bus via one or more switches and/or contactors to (i) power HV loads within the electrified vehicle or (ii) power HV loads outside the electrified vehicle. The method includes operating, by a controller having one or more processors, in a vehicle-to-vehicle (V2V) charging mode.

In one example implementation, operating in the V2V charging mode includes electrically disconnecting, by the controller and the one or more switches and/or contactors, the first HV battery pack from the HV bus to function as a reserve battery; electrically connecting, by the controller and the one or more switches and/or contactors, the second HV battery pack to the HV bus to function as a donor battery; and discharging the second HV battery pack to charge an additional electrified vehicle or power outside HV loads, while maintaining a charge of the first HV battery pack to thereby reserve power for future driving of the electrified vehicle.

In addition to the foregoing, the described method may include one or more of the following features: wherein the first and second battery packs are each 400 V battery packs;

disabling, by the controller, all HV loads on the HV electrical system and confirming a battery current is less than a predetermined threshold prior to electrically disconnecting the first HV battery pack; providing, by the controller and a human machine interface (HMI), a user notification that the V2V charging mode is in progress and to allow for configuration of the HV battery system for external discharge; and stopping, by the controller, the discharge of the second HV battery pack when a state of charge (SOC) of the second HV battery pack reaches a predetermined minimum threshold.

In addition to the foregoing, the described method may include one or more of the following features: providing, by the controller and a human machine interface (HMI), an option for a user to select the predetermined minimum threshold SOC; transitioning the electrified vehicle from the V2V charging mode to a drive mode, including, electrically disconnecting, by the controller and the one or more switches and/or contactors, the discharged second HV battery pack, and electrically connecting, by the controller and the one or more switches and/or contactors, the reserve first HV battery pack to the HV bus to provide power to drive the electrified vehicle; and transitioning the electrified vehicle from the drive mode to a charge mode, including, determining, by the controller, if a difference in a state of charge (SOC) of the first HV battery pack and a SOC of the second HV battery pack is within a predetermined threshold.

In addition to the foregoing, the described method may include one or more of the following features: wherein if the difference of the SOC of the first HV battery pack and the SOC of the second HV battery pack is less than the predetermined threshold, the method further includes disabling, by the controller, all HV loads; electrically disconnecting, by the controller, the first HV battery pack from the HV bus; electrically connecting, by the controller, the second HV battery pack in parallel with the first HV battery pack; electrically connecting, by the controller, both the first and second HV battery packs to the HV bus; and charging both the first and second HV battery packs simultaneously.

In addition to the foregoing, the described method may include one or more of the following features: wherein if the difference of the SOC of the first HV battery pack and the SOC of the second HV battery pack is greater than the predetermined threshold, the method further includes disabling, by the controller, all HV loads; electrically disconnecting, by the controller, the first HV battery pack from the HV bus; electrically connecting, by the controller, the second HV battery pack to the HV bus; charging the second HV battery pack until the SOC of the second HV battery pack is substantially similar to the SOC of the first HV battery pack; suspending charging and disabling all HV loads, by the controller; electrically connecting, by the controller, the first HV battery pack to the HV bus; and resuming charging, by the controller, and charging both the first and second HV battery packs simultaneously.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

As previously discussed, electrified vehicles (EVs) typically include an electrified powertrain with one or more electric traction motors powered by a high voltage (HV) battery system. The high voltage battery system may also be utilized to power other high voltage loads within the vehicle, or even power/charge high voltage loads outside the vehicle, such as other electrified vehicles. However, powering external loads may inadvertently drain the HV battery system until the electrified vehicle is no longer drivable.

Accordingly, described herein are systems and methods for a HV battery system with dual HV battery packs and a switchable battery architecture. The HV battery system may be selectively configured to power an external load with one of the HV battery packs, while the other HV battery pack is disconnected to reserve power for the electrified vehicle. The depleted HV battery pack may then be disconnected and recharged at a later time.

In general, the HV battery system architecture includes two substantially similar HV batteries (e.g., ~400V each) with a collection of switches or contactors that can be combined and configured to connect both HV batteries in a parallel mode (e.g., ~400V) for driving and charging, or a series mode (e.g., ~800V) for fast charging. From the powertrain perspective, the HV loads are 400V in nature and are connected to the batteries via switches/contactors and a power distribution center.

The HV battery system architecture allows the option to connect a plug to either charge the HV battery from electric vehicle supply equipment (EVSE) or discharge the HV battery to supply AC power to another vehicle or other loads. The charge or discharge mechanism for AC is typically via an integrated dual charge module (IDCM) as it converts AC to DC power and vice versa. For DC charging or discharging, the IDCM is utilized as a medium for communication, but the power transfer is between the EVSE/External DC load and the vehicle. Additionally, the drive motors/inverters are also powered by the HV batteries for propulsion. The HV loads and the motor/inverter system are connected to the same HV batteries, but via different connectors and have different fuses as well because the drive motors/inverters are rated at higher power.

Figure 3:
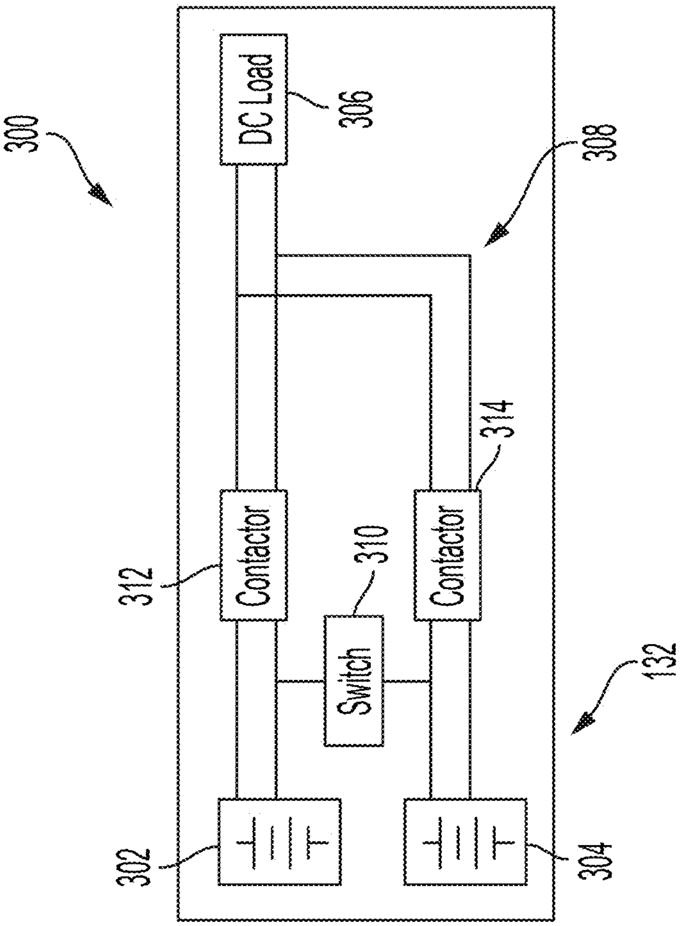
FIG. 3 is an example battery architecture of the configurable high voltage battery system, in accordance with the principles of the present disclosure.

In one example, the switchable HV battery architecture allows two separate HV battery packs (~400V) to be connected in some configuration via switches and/or contactors, such as in series or parallel to each other (e.g., see FIG. 3). When the HV battery packs are connected in parallel, the system behaves like one battery pack of 400V, but with more power and capacity than a single battery arrangement. The HV loads (e.g., electric heater, electric air compressor, DC/DC converter to support 12V loads, onboard power panels, electric drive motors, etc.), which require 400V to operate, can be connected to this parallel battery system for their operation (e.g., see FIG. 4).

The dual HV battery packs can be utilized to power HV loads within the vehicle as well as to power loads (or discharge) outside of the vehicle. One example discharging function is vehicle-to-vehicle (V2V) transfer where an external device or plug is connected to the charge port of the vehicle like a charge plug connection when charging the vehicle from an EVSE. The external device or discharge plug is then connected to a receptor vehicle, and power is flowed from the donor vehicle into the receptor vehicle. The IDCM may be connected to this external plug on the charge port inlet of the vehicle, and it can convert power (DC to AC) from the battery pack and make it available as 120V or 240V AC at the charge port, which is then used by the receptor vehicle to convert it back to DC (e.g., 400V) to charge its HV battery.

While the V2V charging function allows for donating charge to other vehicles, such an operation also drains the donor vehicle state of charge (SOC) at the end of the power transfer. Such an exchange would typically occur when a driver is stranded and needs enough battery charge to drive to the next charging station or home. However, it is important for the donor vehicle to reserve enough battery charge to drive to the next charging location or risk becoming stranded themselves. Accordingly, the dual HV battery pack system provides the opportunity to both donate and reserve charge, keeping in mind that operating both HV battery packs together in parallel may require both HV battery packs to be within an acceptable SOC threshold difference of each other. Otherwise, there is a possibility of damaging the hardware due to high in-rush current (e.g., due to potential difference).

For V2V power transfer, the switchable HV battery system utilizes one of the dual HV battery packs for donating charge, while reserving the other dual HV battery pack for driving to a recharging location. In one example, the supervisory controller determines if V2V is requested by detecting the plug connection at the charge port and/or a user request via human machine interface (HMI) in the vehicle once the user plugs into the vehicle charge port inlet and selects the V2V power transfer option. When the V2V feature is requested, the supervisory controller will notify the user that it is preparing the vehicle for transfer and at some steps indicate the progress. Part of this preparation process involves reconfiguring the HV battery packs such that only one battery pack is utilized for donating charge while the other is reserved for driving to a charging location.

The system performs this operation by first disabling all the HV loads and monitoring the feedback from the loads and current to safely disconnect one of the HV battery packs from the powertrain while keeping the other HV battery pack connected to the powertrain. Once this step is achieved, the user is notified to plug in the V2V cable (if not already done so). In some cases, plugging in after the HV battery system has been reconfigured is a desired option as there is no communication protocol between the vehicles other than the cables being detected, to avoid delays and timeout in the system. Once both the vehicles enter power transfer, the progress will be displayed to the user in the donor vehicle, and this will continue until the connected battery SOC reaches a predetermined minimum threshold (e.g., as set by the user at the beginning of the V2V session).

Once the SOC threshold is reached, the donor vehicle will stop the power transfer, V2V is deemed complete, and the user is notified of the same in the HMI (or mobile app). The donor vehicle supervisory controller then reconfigures the HV battery system to allow the donor vehicle to be driven away. The system disables all the HV loads and monitors the feedback before disconnecting the drained HV battery. The system then connects the reserve HV battery to the powertrain and notifies the user for drive-readiness of the vehicle. Both the donor and receptor vehicles can then be driven away. At a later point, when the donor vehicle is connected to a charging station, the supervisory controller detects the charging plug and then reconfigures the battery system again for accepting charge.

In some cases, for accepting charge, the vehicle can only do so from a 400V charging system since one of the batteries is already drained and there is an SOC imbalance between both the HV battery packs. If the SOC of both the HV batteries are within acceptable range of each other (e.g., 10%), then both can be charged simultaneously. However, if the difference in SOC is considerably higher (e.g., >20%), then charging both HV battery packs is undesirable since this could potentially lead to potential welds and damage to the hardware. Accordingly, the supervisory controller checks the SOC of both the batteries, and if they are within an acceptable threshold, the controller prepares the vehicle for charging in 400V parallel mode.

First, all the HV loads are disabled and the feedback from those components are monitored. The supervisory controller also monitors the current flowing into or out of the connected HV battery (or reserve battery) and disconnects that HV battery once the current is below a predetermined acceptable threshold. Subsequently, both the HV batteries are connected to each other in parallel mode and then connected to the vehicle, following which the HV loads are re-enabled and charging commences until both HV batteries are full.

In the situation where the difference in SOC between both the HV batteries is outside the acceptable tolerance, the supervisory controller will either charge the connected battery until a certain SOC threshold (comparable to the discharged battery), or disconnect the reserved battery (if SOC is higher) first, then then connect the depleted or discharged battery to the vehicle to allow charging until the predetermined SOC threshold. Once both the HV batteries are within the SOC tolerance of each other, the system will temporarily halt charging, disable the HV loads, and wait for the current to fall below a predetermined threshold. The system then connects the other battery to the system and resumes charging until full.

Figure 1:
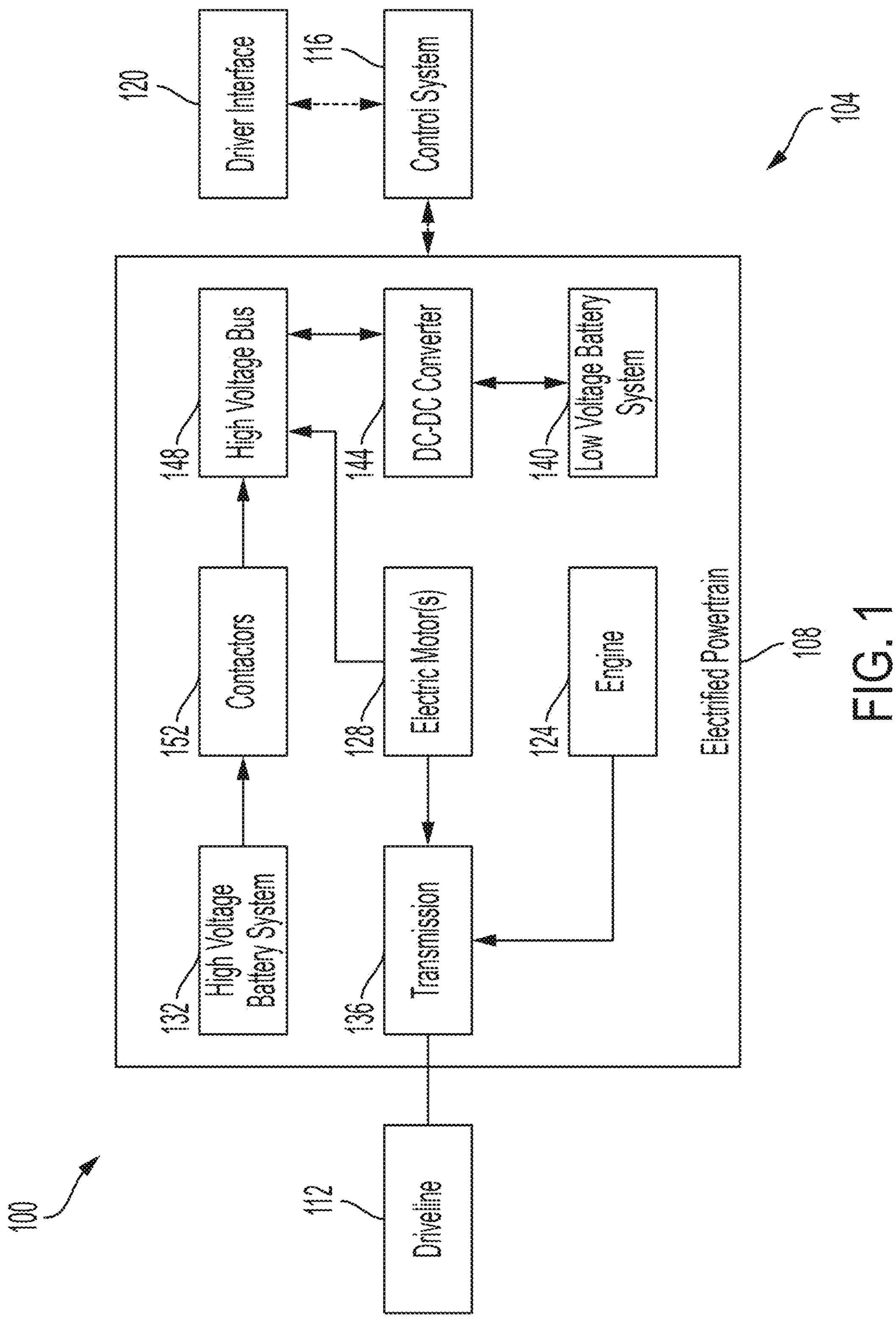
FIG. 1 is a functional block diagram of an electrified vehicle having a configurable high voltage battery system, in accordance with the principles of the present disclosure.

Referring now to FIG. 1, a functional block diagram of an electrified vehicle 100 having an example high voltage (HV) battery control system 104 according to the principles of the present application is illustrated. The vehicle 100 comprises an electrified powertrain 108 configured to generate and transfer drive torque to a driveline 112 for vehicle propulsion. A control system 116 is configured to control the electrified powertrain 108, such as to generate a desired amount of drive torque to satisfy a driver torque request received via a driver interface 120 (e.g., an accelerator pedal) and based on torque-related parameters. The electrified powertrain 108 comprises an optional internal combustion engine 124 configured to combust a mixture of air and fuel (e.g., gasoline) to generate drive torque at a crankshaft (not shown). The electrified powertrain 108 also comprises one or more electric motors 128 configured to, when operating as torque generators, generate drive torque using electrical energy from a high voltage battery system 132.

It will be appreciated that the electrified vehicle 100 could have any suitable powertrain configuration, such as a battery electric vehicle (BEV). The drive torque from the electric motor(s) 128 and the optional engine 124 is transferred to the driveline 112 via a gearbox or transmission 136. The electrified powertrain 108 further comprises a low voltage (e.g., 12V) battery system 140 that is connected directly or via a DC-DC converter 144 to a high voltage bus 148, which is also electrically isolated from the high voltage battery system 132 by a set of contactors 152.

Figure 2:
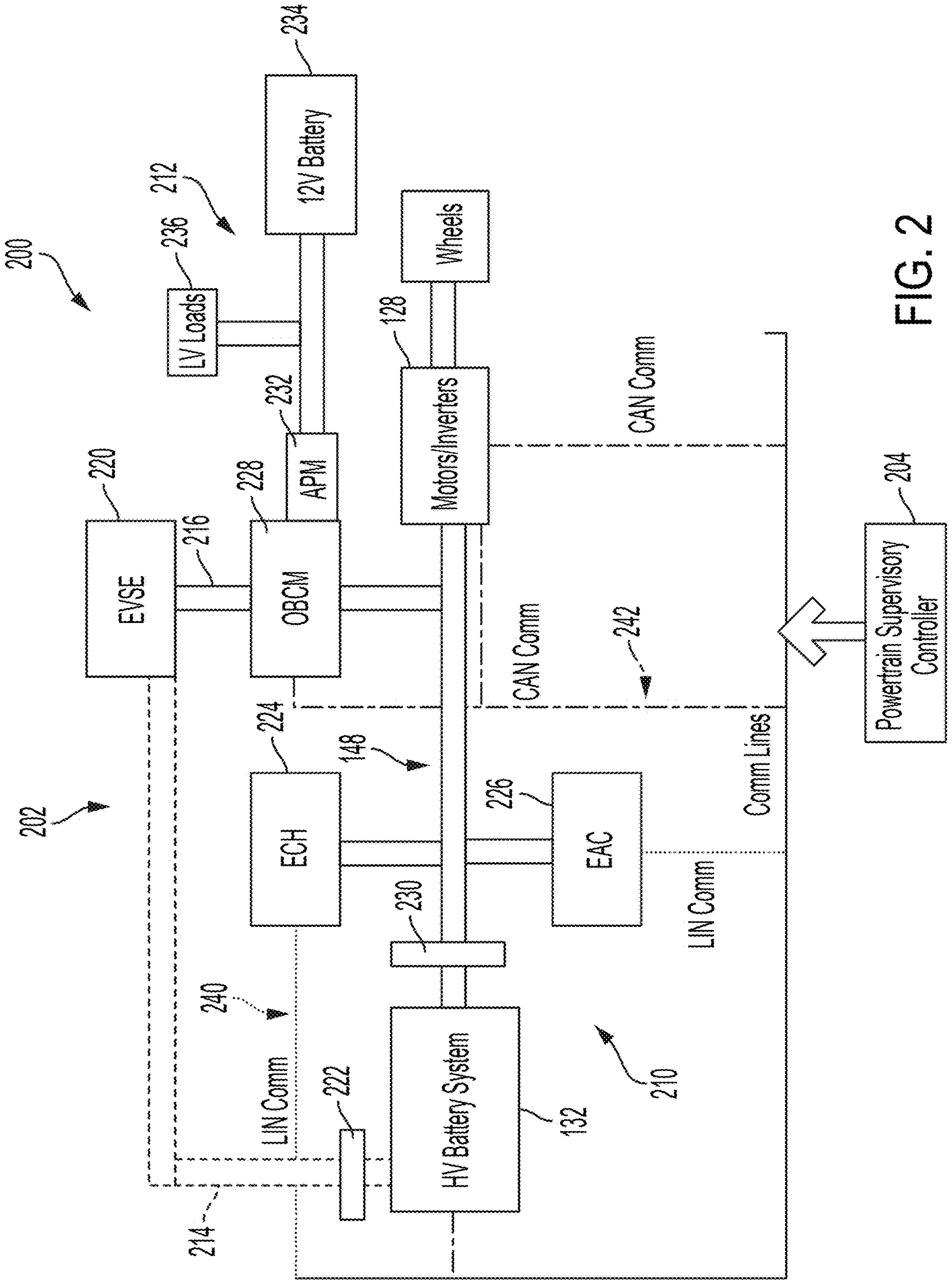
FIG. 2 is a functional block diagram of an example architecture of the configurable high voltage battery system, in accordance with the principles of the present disclosure.

Referring now to FIG. 2, a functional block diagram of an example architecture 200 for the HV battery control system 104 according to the principles of the present application is illustrated. It will be appreciated that this is merely one exemplary configuration of the HV battery control system 104 and other implementations could be utilized. The architecture 200 illustrates an electrical system 202 of the vehicle 100, and a supervisory controller 204 with one or more sub-controllers that collectively form the control system 116.

The electrical system 202 includes a HV electrical system 210 and a low voltage (LV) electrical system 212. The HV electrical system 210 includes a HV DC connection 214, the HV bus 148, and a HV electrical connection 216. The HV DC connection 214 provides a HV connection between the HV battery system 132 and an EVSE 220 via a first contactor 222. The HV bus 148 provides a HV connection between the HV battery system 132 and an electric coolant heater (ECH) 224, an electric air compressor (EAC) 226, an onboard charging module (OBCM) 228, and the electric traction motor(s) 128 via a second contactor 230. The HV electrical connection 216 provides a HV connection (e.g., 120V/240V/400V) via a plug (AC/DC). The LV electrical system 212 provides a LV connection between an auxiliary power module (APM) 232, a LV battery 234 (e.g., 12V), and other LV loads 236. The OBCM 228 and APM 232 may be collectively referred to as an IDCM.

In the example embodiment, the powertrain supervisory controller 204 is in signal communication with the ECH 224, EAC 226, OBCM 228, and electric traction motor(s) 128 via any suitable network such as, for example, a LIN bus 240 and/or CAN bus 242. The supervisory controller 204 is also in signal communication with the contactors 222, 230 for switching the configuration of the HV battery system 132, as described herein in more detail.

Figure 4:
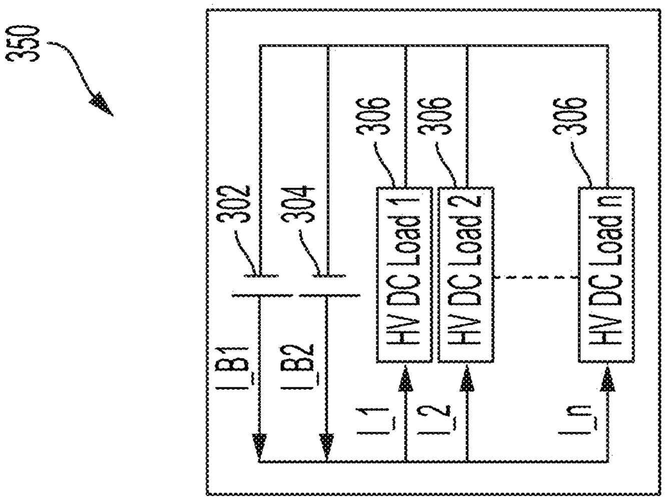
FIG. 4 is an example circuit illustrating a pair of high voltage batteries of the configurable high voltage battery system, in accordance with the principles of the present disclosure.

FIG. 3 illustrates an example switchable architecture 300 of the HV battery system 132. In the example embodiment, the HV battery system 132 includes a first battery pack 302 and a second battery pack 304 selectively connected to HV loads 306 (e.g., electric motor 128) via a HV bus 308, a switch 310, and contactors 312, 314. The supervisory controller 204 is configured to control the switch 310 and contactors 312, 314 to separately disconnect each of the HV battery packs 302, 304, or connect both the HV battery packs 302, 304 in series or in parallel. For example, FIG. 4 illustrates an example circuit 350 showing the first and second HV battery packs 302, 304 connected in parallel to provide power to HV loads 306.

In the example embodiment, the switch 310 and contactors 312, 314 selectively establish an electrical connection between the HV battery system 132 and the HV bus 308. The supervisory controller 204 (e.g., an electric vehicle control unit, or EVCU) is configured to detect a request to perform a high voltage connection procedure where the high voltage battery system 132 that is disconnected by contactors 312, 314 in an open state is subsequently connected to the HV bus 308. This request, for example only, could be a request for one of (i) powering the electric motor(s) 128 for vehicle propulsion, (ii) recharging the high voltage battery system 132, and (iii) thermal conditioning of the high voltage battery system 132 and/or a cabin environment of the vehicle 100.

The supervisory controller 204 is also configured to detect a request to perform a high voltage disconnection procedure (e.g., a contactor opening procedure) where the HV battery system 132 that is connected by switch 310 and/or contactors 312, 314 in a closed state is subsequently disconnected from the HV bus 308. This request, for example only, could be a request for powering down the vehicle after the ignition is keyed OFF.

Figure 5A:
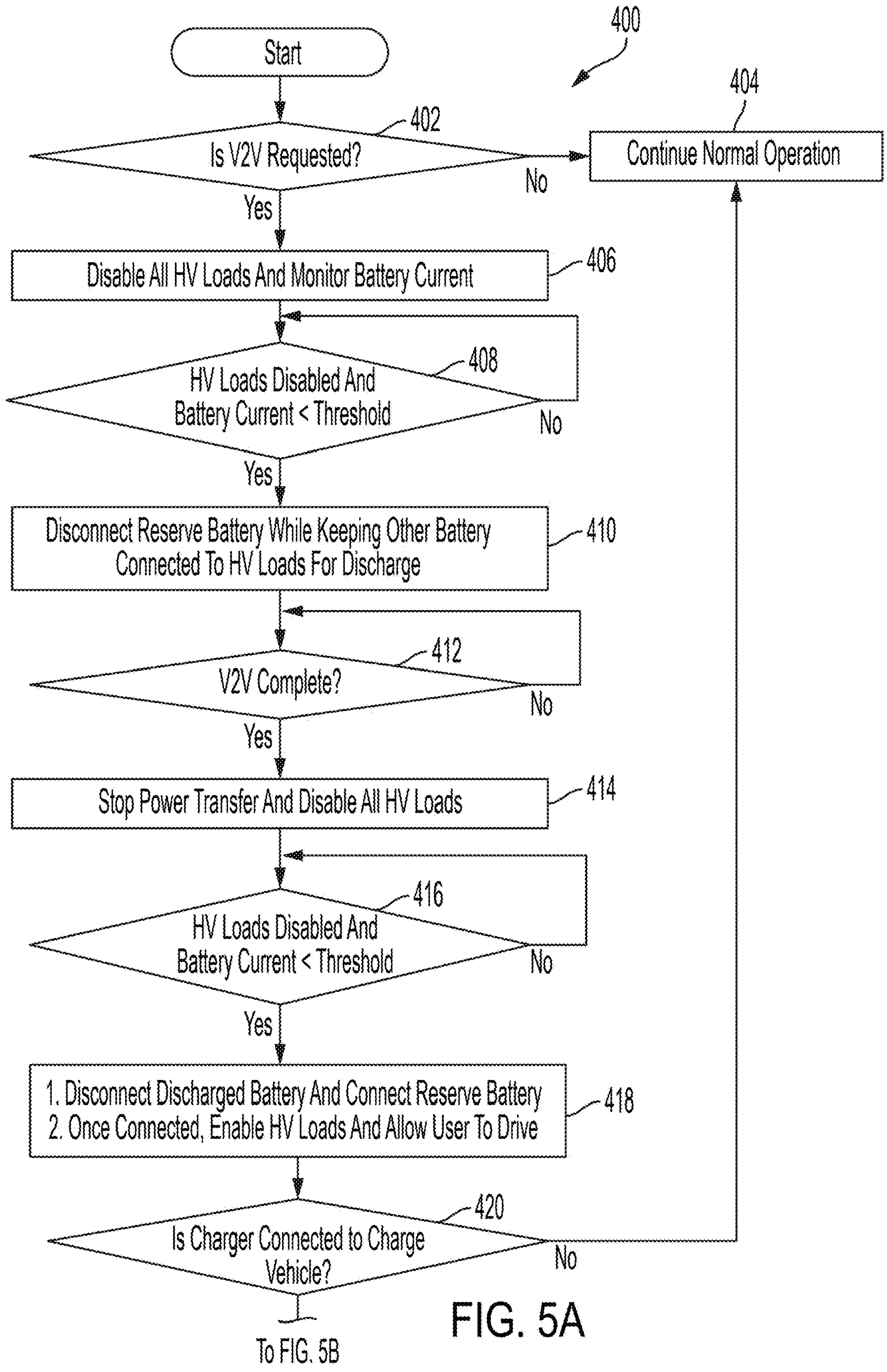
FIGS. 5A-5B illustrate a flow diagram of an example method of operating the electrified vehicle of FIG. 1 in accordance with the principles of the present disclosure.
Figure 5B:
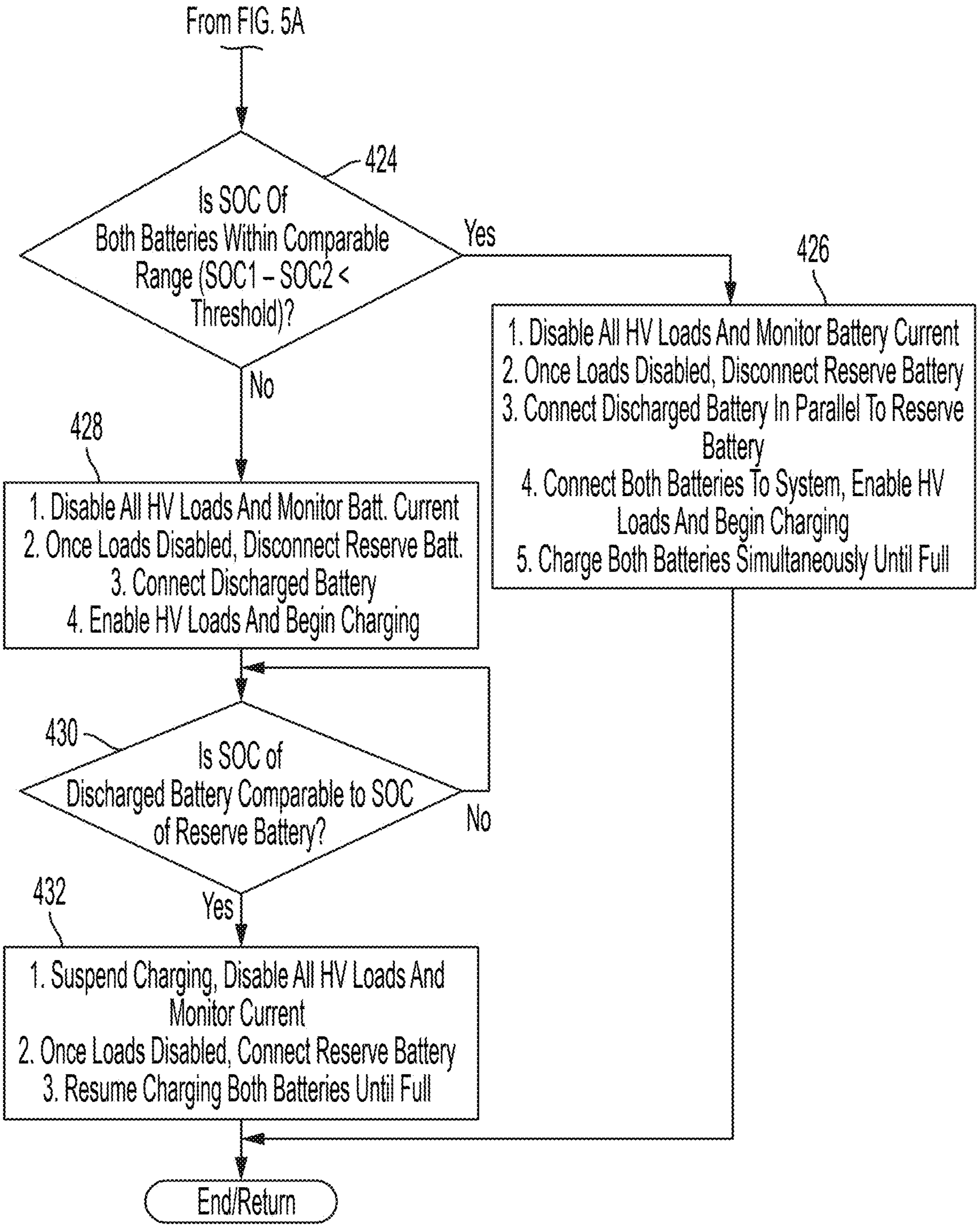

Referring now to FIGS. 5A-5B, a flow diagram of an example method 400 of controlling the HV battery control system 104 of an electrified vehicle according to the principles of the present application is illustrated. While the components of vehicle 100 are referenced for explanatory purposes, it will be appreciated that this method 400 could be applicable to any suitable electrified vehicle. The method begins at 402 and the supervisory controller 204 ("control") determines if a V2V charging operation is requested. If no, control proceeds to 404 and continues normal operation. If yes, control proceeds to 406.

At 406, control disables all HV loads (e.g., 306) and monitors battery current in the system. For example, this disabling may be done by control sending a request to the ECUs of HV components (e.g., e-motor) to turn off their associated HV component. Once a positive response is received from all the HV loads, control will open the contactors 152. Battery current is monitored, for example, to ensure zero or near zero current is on the system before opening the contactors 152 to prevent damage. Control may also provide an HMI notification, for example via driver interface 120, indicating a V2V mode is in progress and to allow for configuration of the battery system for discharge and reserve. At 408, control determines if all HV loads are disabled and the battery current is less than a predetermined threshold. If no, control returns to 408. If yes, control proceeds to 410.

At 410, control disconnects one HV battery pack 302, 304 (reserve battery) from the HV bus 308 while maintaining the electrical connection of the other HV battery pack 302, 304 (donor battery) to the HV bus 308 for discharging. Control may also provide an HMI notification for the user to plug-in the V2V charger cable (not shown) and start the power transfer. The power transfer may be initiated via user-selection on the HMI. The HMI may also provide the user the option to select how much battery SOC to donate to the receptor vehicle. Power transfer continues until the donor battery reaches a predefined threshold SOC (e.g., user-set). At 412, control determines if the V2V mode is complete (e.g., the predefined threshold SOC is met). If no, control returns to 412. If yes, control proceeds to 414.

At 414, control stops the power transfer and then disables all HV loads (e.g., ECH, EAC, DC-DC 12 V charging, etc.). Control may also provide an HMI notification to the user that the power transfer is complete. At 416, control determines if all HV loads are disabled and the battery current is less than the predetermined threshold. If no, control returns to 416. If yes, control proceeds to 418.

Next, the HV battery system 132 must be switched from the V2V charging configuration to the drive mode configuration. At 418, control disconnects the discharged battery (donor battery) from the HV bus 308 and subsequently connects the reserve battery to the HV bus 308. Control then enables HV loads and enables the user to drive vehicle 100, for example to a recharging location.

Next, with the depleted donor battery and the reserve battery likely having a different SOC (e.g., >20%), the HV battery system 132 must be switched again in order to be charged. At 420, control determines if a charger is connected to the vehicle 100 for charging. If no, control continues normal operation at 404. If yes, at 424, control determines if the SOC of both HV battery packs 302, 304 are within a predetermined threshold of each other (e.g., SOC1 SOC2<Threshold?). If yes, control proceeds to 426. If no, control proceeds to 428.

At 426, if the difference in SOC of HV battery packs 302, 304 is less than the predetermined threshold, control disables all HV loads and monitors battery current within the system. Once the loads are disabled, control disconnects the reserve battery from the HV bus 308. Control then connects the discharged donor battery in parallel with the reserve battery. Control then connects both the HV battery packs 302, 304 to the HV bus 308 and enables HV loads to begin charging. Control then charges both HV battery packs 302, 304 simultaneously until full. The method then ends or returns to 402.

At 428, if the difference in SOC of HV battery packs 302, 304 is greater than the predetermined threshold, control disables all HV loads and monitors battery current. Once the HV loads are disabled, control disconnects the reserve battery from the HV bus 308, connects the discharged donor battery to the HV bus 308, and enables HV loads to begin charging. At 430, control determines if the SOC of the discharged donor battery is comparable to the SOC of the reserve battery. If no, control returns to 430. If yes, control proceeds to 432 and suspends charging, disables all HV loads, and monitors the current in the system. Once the HV loads are disabled, control connects the reserve battery to the HV bus 308 and resumes charging both HV battery packs 302, 304 until full. The method then ends or returns to 402.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An electrified vehicle, comprising:

an electrified powertrain configured to generate drive torque;

a high voltage (HV) battery system for powering the electrified powertrain, the HV battery system including a first HV battery pack and a second HV battery pack;

a HV electrical system including one or more switches and/or contactors configured to selectively connect the HV battery system to a HV bus to selectively (i) operate in a first mode to power HV loads within the electrified vehicle and (ii) operate in a second mode to power HV loads outside the electrified vehicle; and a control system including a controller programmed to operate in a vehicle-to-vehicle (V2V) charging mode, comprising:

detect, via a human machine interface (HMI), a V2V charging request and, in response thereto:

electrically disconnect, by the one or more switches and/or contactors, the first HV battery pack from the HV bus to function as a reserve battery;

electrically connect, by the one or more switches and/or contactors, the second HV battery pack to the HV bus to function as a donor battery; and discharge the second HV battery pack to charge an additional electrified vehicle or power outside HV loads, while maintaining a charge of the first HV battery pack to thereby reserve power for future driving of the electrified vehicle.

2. The electrified vehicle of claim 1, wherein the first and second battery packs are each 400 V battery packs.

3. The electrified vehicle of claim 1, wherein operating in the V2V charging mode further comprises:

disabling, by the controller, all HV loads on the HV electrical system and confirming a battery current is less than a predetermined threshold prior to electrically disconnecting the first HV battery pack.

4. The electrified vehicle of claim 1, wherein operating in the V2V charging mode further comprises:

providing, by the controller and the HMI, a user notification that the V2V charging mode is in progress and to allow for configuration of the HV battery system for external discharge.

5. The electrified vehicle of claim 1, wherein operating in the V2V charging mode further comprises:

stopping, by the controller, the discharge of the second HV battery pack when a state of charge (SOC) of the second HV battery pack reaches a predetermined minimum threshold.

6. The electrified vehicle of claim 5, wherein operating in the V2V charging mode further comprises:

providing, by the controller and the HMI, an option for a user to select the predetermined minimum threshold SOC.

7. The electrified vehicle of claim 1, wherein the controller is further programmed to transition the electrified vehicle from the V2V charging mode to a drive mode, comprising:

electrically disconnect, by the one or more switches and/or contactors, the discharged second HV battery pack; and electrically connect, by the one or more switches and/or contactors, the reserve first HV battery pack to the HV bus to provide power to the electrified powertrain to drive the electrified vehicle.

8. The electrified vehicle of claim 7, wherein the controller is further programmed to transition the electrified vehicle from the drive mode to a charge mode, comprising:

determine if a difference in a state of charge (SOC) of the first HV battery pack and a SOC of the second HV battery pack is within a predetermined threshold.

9. The electrified vehicle of claim 8, wherein if the difference of the SOC of the first HV battery pack and the SOC of the second HV battery pack is less than the predetermined threshold, the controller is further programmed to:

disable all HV loads;

electrically disconnect the first HV battery pack from the HV bus;

electrically connect the second HV battery pack in parallel with the first HV battery pack;

electrically connect both the first and second HV battery packs to the HV bus; and charge both the first and second HV battery packs simultaneously.

10. The electrified vehicle of claim 8, wherein if the difference of the SOC of the first HV battery pack and the SOC of the second HV battery pack is greater than the predetermined threshold, the controller is further programmed to:

disable all HV loads;

electrically disconnect the first HV battery pack from the HV bus;

electrically connect the second HV battery pack to the HV bus;

charge the second HV battery pack until the SOC of the second HV battery pack is substantially similar to the SOC of the first HV battery pack;

suspend charging and disable all HV loads;

electrically connect the first HV battery pack to the HV bus; and resume charging and charge both the first and second HV battery packs simultaneously.

11. A method of controlling a high voltage (HV) battery system for an electrified vehicle, the HV battery system having a first HV battery pack and a second HV battery pack configured to selectively connect to a HV bus via one or more switches and/or contactors to (i) power HV loads within the electrified vehicle or (ii) power HV loads outside the electrified vehicle, the method comprising:

operating, by a controller having one or more processors, in a vehicle-to-vehicle (V2V) charging mode, comprising:

detecting, by the controller, a V2V charging request and, in response thereto:

electrically disconnecting, by the controller and the one or more switches and/or contactors, the first HV battery pack from the HV bus to function as a reserve battery;

electrically connecting, by the controller and the one or more switches and/or contactors, the second HV battery pack to the HV bus to function as a donor battery; and discharging the second HV battery pack to charge an additional electrified vehicle or power outside HV loads, while maintaining a charge of the first HV battery pack to thereby reserve power for future driving of the electrified vehicle.

12. The method of claim 11, wherein the first and second battery packs are each 400 V battery packs.

13. The method of claim 11, further comprising:

disabling, by the controller, all HV loads on the HV electrical system and confirming a battery current is less than a predetermined threshold prior to electrically disconnecting the first HV battery pack.

14. The method of claim 11, further comprising:

providing, by the controller and a human machine interface (HMI), a user notification that the V2V charging mode is in progress and to allow for configuration of the HV battery system for external discharge.

15. The method of claim 11, further comprising:

stopping, by the controller, the discharge of the second HV battery pack when a state of charge (SOC) of the second HV battery pack reaches a predetermined minimum threshold.

16. The method of claim 15, further comprising:

providing, by the controller and a human machine interface (HMI), an option for a user to select the predetermined minimum threshold SOC.

17. The method of claim 11, further comprising transitioning the electrified vehicle from the V2V charging mode to a drive mode, comprising:

electrically disconnecting, by the controller and the one or more switches and/or contactors, the discharged second HV battery pack; and electrically connecting, by the controller and the one or more switches and/or contactors, the reserve first HV battery pack to the HV bus to provide power to drive the electrified vehicle.

18. The method of claim 17, further comprising transitioning the electrified vehicle from the drive mode to a charge mode, comprising:

determining, by the controller, if a difference in a state of charge (SOC) of the first HV battery pack and a SOC of the second HV battery pack is within a predetermined threshold.

19. The method of claim 18, wherein if the difference of the SOC of the first HV battery pack and the SOC of the second HV battery pack is less than the predetermined threshold, the method further comprises:

disabling, by the controller, all HV loads;

electrically disconnecting, by the controller, the first HV battery pack from the HV bus;

electrically connecting, by the controller, the second HV battery pack in parallel with the first HV battery pack;

electrically connecting, by the controller, both the first and second HV battery packs to the HV bus; and charging both the first and second HV battery packs simultaneously.

20. The method of claim 19, wherein if the difference of the SOC of the first HV battery pack and the SOC of the second HV battery pack is greater than the predetermined threshold, the method further comprises:

disabling, by the controller, all HV loads;

electrically disconnecting, by the controller, the first HV battery pack from the HV bus;

electrically connecting, by the controller, the second HV battery pack to the HV bus;

charging the second HV battery pack until the SOC of the second HV battery pack is substantially similar to the SOC of the first HV battery pack;

suspending charging and disabling all HV loads, by the controller;

electrically connecting, by the controller, the first HV battery pack to the HV bus; and resuming charging, by the controller, and charging both the first and second HV battery packs simultaneously.

* * * * *